JOHN J. MEYERS
LAWRENCE R. MARTIN
JACOB C. RUBIN
INVENTORS

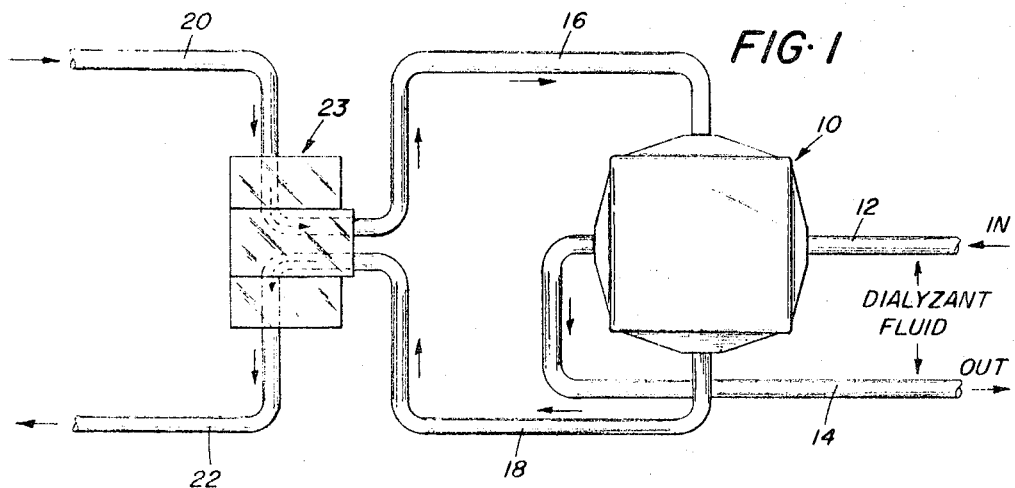
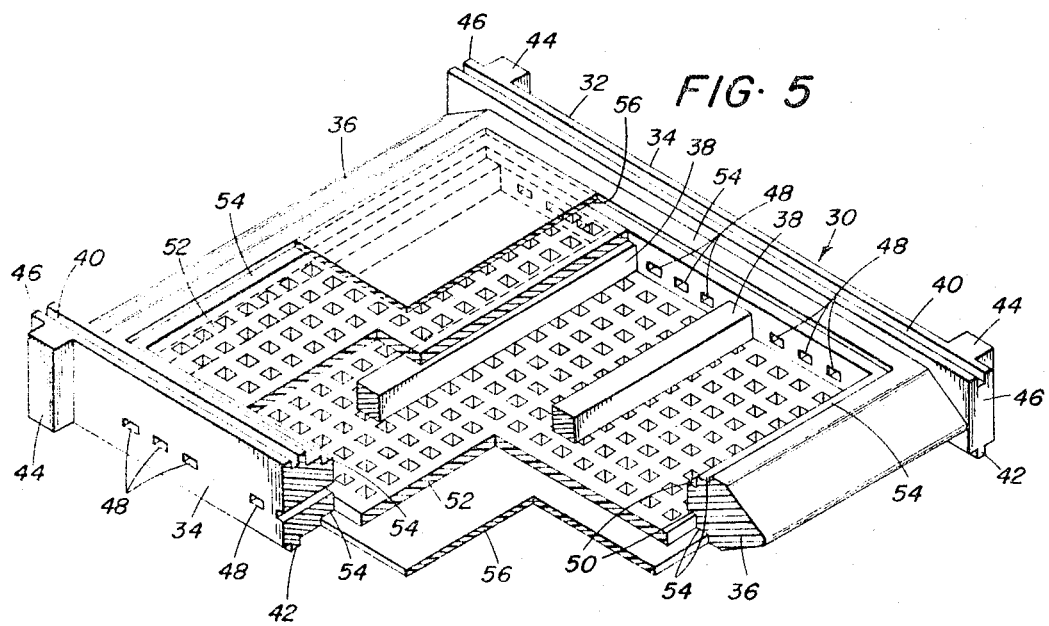

ATTORNEYS

JOHN J. MEYERS
LAWRENCE R. MARTIN
JACOB C. RUBIN
INVENTORS

ATTORNEYS

United States Patent Office 3,464,562
Patented Sept. 2, 1969

3,464,562
DIALYZING APPARATUS AND METHOD OF MAKING THE SAME
John J. Meyers, Lawrence R. Martin, and Jacob C. Rubin, Rochester, N.Y., assignors to Eastman Kodak Company, Rochester, N.Y., a corporation of New Jersey
Filed Jan. 12, 1967, Ser. No. 608,784
Int. Cl. B01d 13/00
U.S. Cl. 210—321
12 Claims

ABSTRACT OF THE DISCLOSURE

A dialyzing cartridge comprising an assembly of stacked dialyzing elements each comprising a molded frame having spaced membrane walls. The stacked elements are enclosed by a housing which has selected portions thereof sealed to selected portions of the stacked assembly to define inlet and outlet manifolds for dialyzant and fluid to be dialyzed.

---

This invention relates to the art of dialyzing, filtering, etc. and more specifically to improved dialyzing apparatus and the method of making the same.

The invention has particular utility as an artificial kidney for treating uremic patients in the hospital or home, and the following disclosure is accordingly directed to this application of the invention. As will be apparent from the ensuing description, however, the specific structure disclosed as one embodiment of the invention is not limited to this specific application and the features herein disclosed may be readily incorporated into specific devices for other dialyzing applications and filtering applications.

Basically a dialyzer comprises a semipermeable membrane contacted by fluid to be dialyzed on one side and an aqueous solution or dialyzant on the other. Impurities in the fluid are transferred through the membrane to the dialyzant by dialysis. This basic process is well known and a specific explanation of the theory surrounding the impurity transfer is deemed to be unnecessary for an understanding of the present invention.

It is known in the dialyzing art to stack a plurality of membranes to establish alternate layers of fluid to be dialyzed and dialyzant for the purpose of conserving space and increasing the effective capacity of a specific dialyzer. One approach to stacking of membranes is disclosed in U.S. Patent No. 3,266,629 wherein there is shown a dialyzer comprising a plurality of thin membranes fixed to supporting frames which are stacked and rigidly held together by suitable clamping means. A second approach is disclosed in U.S. Patent No. 2,982,416 wherein there is shown a dialyzer comprising grooved sheets of semipermeable material stacked with the grooves of each successive sheet angularly disposed with respect to the sheet adjacent to it. In the latter approach fluid to be dialyzed is passed through the grooves extending in one direction while the dialyzant is passed through the other grooves to thus establish alternate layers of fluid to be dialyzed and dialyzant.

In dialysis the thickness and permeability of the semipermeable medium separating the fluid to be dialyzed and the dialyzant are selected in accordance with the molecule size of the impurities to be removed by dialysis. The medium must be permeable with respect to the impurity molecules to be transferred to the dialyzant and nonpermeable to other molecules. In artificial kidneys high permeability membranes having a thickness in the order of .001 inch or less are preferred to achieve an efficient transfer of urea and/or other molecules including water from the blood to the dialyzant.

Due to the thinness and fragility of membranes utilized in the dialysis of blood the stacked frame supported membrane approach such as disclosed in U.S. Patent No. 3,266,629 is preferred in an artificial kidney. In contrast the stacked sheet approach disclosed in U.S. Patent 2,982,416 is generally not practical for the dialysis of blood since the grooved sheets must necessarily have sufficiently thickness to retain their configuration when subjected to blood pressure and to impart rigidity to the stacked assembly. To achieve the desired strength and rigidity it is necessary to use sheets having a thickness substantially exceeding the optimum thickness for blood dialysis. Since the efficiency of blood dialysis is inversely proportional to the thickness of the semipermeable medium separating the blood and dialyzant the minimum thickness which can be practicably achieved renders the stacked sheet construction such as disclosed in U.S. Patent 2,982,416 unsuitable for artificial kidney design.

While the preferred approach to artificial kidney design is the use of stacked frame supported membranes, currently available artificial kidneys in accordance with this approach posses a number of structural and functional limitations and disadvantages which have limited the general use of artificial kidneys in the medical field. Some of the significant disadvantages of currently available kidneys are their characteristic unwieldy size, large pressure drops, high cost and general complexity. To achieve maximum dialysis it is customary to provide large area membranes supported by large supporting frames. Complex arrangements are typically provided to space the membranes and distribute the blood and dialyzant to opposite sides of the individual membranes. The blood capacity of the dialyzer is generally such that the patient must be given a transfusion during a treatment. Because of the high blood pressure resulting from the high blood capacity it is customary to use bolts or other rigid clamping devices to retain the frames supporting the membranes together to add to the complexity of the structure.

The large pressure drop characteristic of currently available kidneys is a very significant disadvantage in that it necessitates the provision of pumping apparatus and associated hardware for circulating blood through the system. Such pumping apparatus materially increases the cost of the system and introduces complex medical problems including the possibility of air entrapment and the possibility of producing undesirable shear forces on the blood.

Because of the above limitations artificial kidneys are currently only available at some of the more advanced hospitals and must be attended by a skilled technician. Moreover, due to the high initial cost of the equipment and the high operational cost, the equipment is not available to many patients.

It is a principal object of the present invention to provide a low cost artificial kidney cartridge comprising stacked supported membranes which is not subject to the limitations and disadvantages discussed above.

Another object of the invention is to provide a low cost artificial kidney cartridge utilizing stacked supported membranes which can be disposed of after a single usage.

Another object of the invention is to provide an artificial kidney cartridge of the stacked supported membrane type having a blood capacity less than 60 cc. or about ⅛ pint.

Another object of the invention is to provide a disposable artificial kidney cartridge of the stacked supported membrane type formed entirely from low cost plastic parts and having a physical size such that it can be utilized in the home.

Another object of the invention is to provide an artificial kidney having a pressure drop small enough such that blood can be circulated through the cartridge by the patient's heart without the use of auxiliary pumping apparatus.

In the disclosed specific embodiment of the invention a stacked assembly of dialyzing elements is enclosed by a housing to form a dialyzer cartridge. Each dialyzing element comprises a frame having spaced membrane walls sealed thereto to enclose the frame and having openings for fluid flow through the interior of the frame in contact with the interior surfaces of said walls. The dialyzing elements are stacked with the adjacent walls of adjacent elements in closely spaced relationship. Manifolds defined by the housing and the stacked assembly are effective to establish parallel flow of a first fluid between the dialyzing elements and parallel flow paths for a second fluid through the interiors of the dialyzing elements. The dialyzing elements are uniquely sized to achieve optimum mass transfer characteristics.

When used as an artificial kidney a patient's blood may be passed between the dialyzer elements and a dialyzant may be passed through the interiors of the dialyzing elements. By virtue of the close spacing of adjacent membrane walls of adjacent dialyzing elements the blood capacity of the dialyzer is minimum.

For artificial kidney applications a cartridge in accordance with the invention is small enough that the parts forming the same can be fabricated using low cost medically acceptable plastic materials and can be assembled using various low cost medically acceptable techniques including cementing, heat welding, ultrasonic welding, etc. The frames forming the dialyzer elements can be molded, for example, from suitable plastic material, and the membranes may be fixed therein by cementing or welding. The housing may be similarly molded from a suitable plastic material and cemented or welded to the stacked assembly of dialyzing elements.

Other objects and advantages will become apparent from the following description taken in connection with the accompanying drawings wherein:

FIG. 1 is a schematic illustration of an artificial kidney system with a top view of a dialyzing cartridge in accordance with the invention;

FIG. 5 is an enlarged perspective view of a dialyzing element in accordance with the invention;

Figure 3:
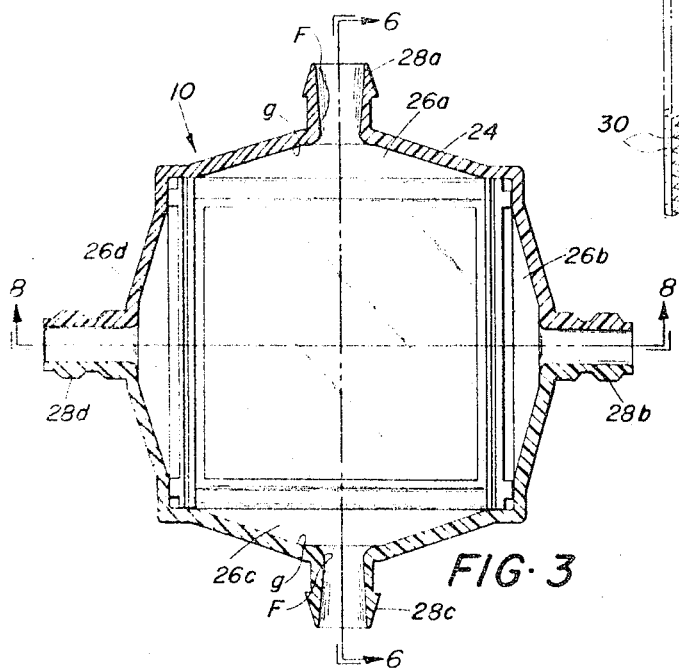
FIG. 3 is a section taken generally along the line 3—3 of FIG. 2.
Figure 6:
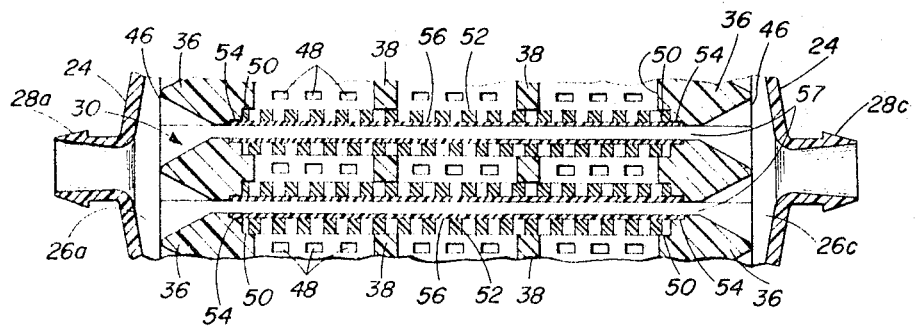
Figure 7:
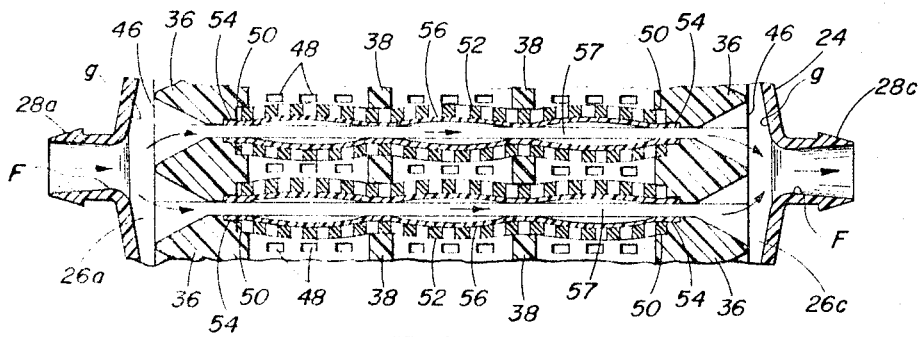
Figure 8:
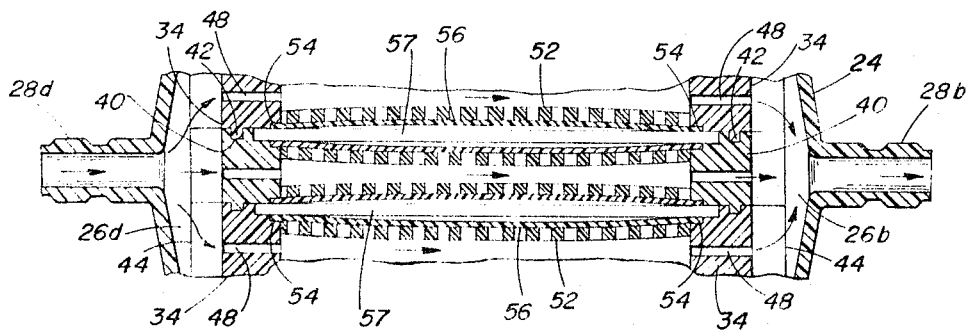

FIGS. 6 and 7 are enlarged partial sections taken along the line 6—6 of FIG. 3 showing several stacked dialyzing elements and the configuration of the membrane walls thereof in the absence of and during fluid flow through the cartridge respectively; and FIG. 8 is an enlarged partial section similar to FIG. 6 but taken along the line 8—8 of FIG. 3.

Referring to FIG. 1 of the drawings there is shown a dialyzing system which includes a dialyzer cartridge 10 in accordance with the invention. The cartridge 10 is connected to a source of dialyzant (not shown) by conduits 12 and 14 as indicated schematically in FIG. 1. When the cartridge 10 is utilized as an artificial kidney it may be provided with inlet and outlet conduits 16 and 18 for blood arranged to be coupled to conduits 20 and 22 communicating with a patient's artery and vein cannula (not shown) by means of a coupling device 23. The coupling device 23 may taken the form of that disclosed in copending application Ser. No. 608,855, filed on Jan. 12, 1967 by Edward J. Mattson et al. and assigned to the same assignee as the present invention. Suitable artery and vein cannula may take the form of that disclosed in copending application Ser. No. 608,907, filed on Jan. 12, 1968 by George Wolf and also assigned to the same assignee as the present invention.

Figure 2:
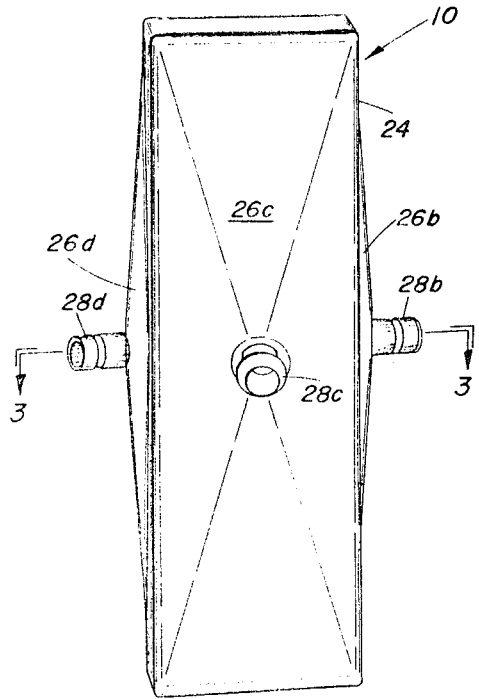
FIG. 2 is a perspective view of the cartridge shown of FIG. 1.
Figure 4:
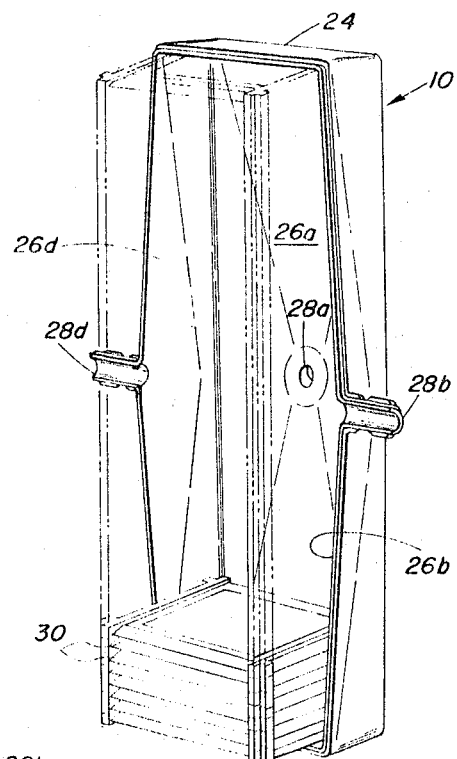
FIG. 4 is a perspective view of the dialyzer cartridge with one part of the housing removed showing a number of stacked dialyzing elements.

Referring now to FIGS. 2, 3, and 4 of the drawings the cartridge 10 in accordance with one embodiment of the invention comprises a two part housing 24 defining separate housing half sections as more clearly shown in FIGS. 3 and 4. The housing 24 is of generally elongated rectangular shaped configuration and of generally square cross section except for the medial sidewall portions which are slightly bulged to define a plurality of longitudinal fluid manifolds 26 which are separately identified by the suffix letters a, b, c, and d and which will be hereinafter described in more detail. The manifolds 26 are provided with fluid inlet and outlet nipples 28 also separately identified by the suffix letters a, b, c, and d. As shown more clearly in FIG. 3 the inlet and outlet nipples may comprise integrally-formed parts of configuration to facilitate the coupling of conduits thereto by suitable clamps. As will later be described in more detail the nipples 28a and 28c have internal flow passages f which in cooperation with the adjacent surfaces g of manifolds 26a and 26c effectively define converging-diverging nozzles to facilitate the flow of blood through the cartridge 10 when it is employed as an artificial kidney.

As will be apparent from FIGS. 2 and 3 the two part housing 24 comprises identical half sections divided by a longitudinal plane extending through the nipples 28b and 28d. The housing sections may be stamped or molded from suitable materials such as plastic and may be retained together by welding or use of a suitable cement as will later be described in more detail in connection with the specific advantages of the disclosed embodiment.

Referring now to FIGS. 4, 5, 6, 7, and 8 of the drawings and first to FIG. 4, the housing 24 contains a plurality of stacked dialyzing elements 30 of relatively thin rectangular shaped configuration which are stacked as shown in FIG. 4 within the housing 24. In a completed cartridge the elements 30 would be stacked to fill the space between the upper and lower end walls and to substantially fill the housing 24.

Referring now to FIG. 5 of the drawings each of the dialyzing elements 30 in the disclosed embodiment of the invention includes a generally open rectangular shaped frame 32 comprising a pair of opposite border segments 34 having a predetermined thickness and a configuration to facilitate stacking of the dialyzing elements 30 and a pair of opposite border segments 36 of lesser thickness shaped to facilitate the flow of fluid between adjacent elements of a stacked assembly in the manner hereinafter described. A pair of spaced supporting ribs 38 extend between the border segments 34 to provide support for the parts later to be described.

Referring specifically to the opposite segments 34, each segment is provided with a longitudinal groove or recess 40 in the upper surface thereof and a longitudinal tongue or depending flange 42 in the lower surface thereof. The flanges 42 on the lower surfaces of the segments 34 are complementally arranged with respect to the grooves 40 in the upper surfaces of the segments 42 to be received by the grooves 40 of the adjacent frame 32 upon stacking of the dialyzer elements as shown more clearly in FIG. 8 of the drawings. In the disclosed embodiment the frames 32 are accordingly adapted to be stacked together in a "tongue and groove" arrangement.

The opposite segments 34 of each frame 32 also define integral rectangular shaped posts 44 and adjacent end portions 46 which abut against the posts 44 and the end portions 46 of adjacent frames 32 when the frames are stacked to thereby define longitudinal surfaces to which the corners of the housing 24 are sealed during assembly of the cartridge as will later be described in more detail.

The opposite segments 34 are additionally provided with a plurality of openings 48 for the flow of fluid through the frame as will later be described.

The opposite segments 36 are of generally wedge shaped configuration to present a minimum resistance to fluid flow between adjacent dialyzing elements 30 as will later be described in more detail. In the disclosed embodiment the segments 36 define upper and lower spaced recessed surfaces 50 which lie in planes defined by the upper and lower surfaces of ribs 38 respectively. The surfaces 50 and ribs 38 provide support for a pair of wire or plastic mesh sheets 52 which engage the surfaces 50 and ribs 38 in the manner shown in FIG. 5. Although not necessary the sheets 52 may be fixed to the surfaces 50 and/or the ribs 38 by a suitable cement or by welding.

In the disclosed embodiment the opposite frame segments 34 and 36 cooperate to define upper and lower recessed perimeter surfaces 54 which lie in planes defined by the upper and lower surfaces of the mesh sheets 52 respectively and to which are sealed the edges of a pair of membranes 56 of semi-permeable material. The membranes 56 may be sealed to the surfaces 54 by various techniques including cementing, heat welding, etc., to enclose the hollow interior of the frame 34 and define a pair of spaced membrane walls. The surfaces 54 are recessed so that the exterior surfaces of the membranes 56 are substantially flush with or have a coplanar relationship with the upper and lower surfaces of the frame segments 36. The membranes are accordingly spaced by the thickness of the segments 36. The membranes 56 may be formed from a material such as cellophane and should have a thickness in the order of .001 inch or less when the dialyzing elements 30 are used to dialyze blood. The inner wall surfaces of the membranes 56 engage and are supported by the mesh sheets 52 which are effective to prevent stretching thereof during pressure variations.

When the dialyzing elements 30 are stacked as shown in FIG. 4 the adjacent membranes 56 of adjacent dialyzing elements 30 are preferably positioned in closely spaced relationship and nearly in contact to establish relatively thin fluid chamber or passage 57 between the membranes for a purpose also hereinafter described in more detail. As will be apparent from the drawings the cross sectional dimensions of this passage comprises the width of segments 36 and the spacing between adjacent membranes of adjacent dialyzing elements 30. The length of the flow passage is equal to the length of segments 34. As will later be described in more detail, the segments 34 and 36 are preferably sized such that the spacing between the membranes 56 is minimum in order to optimize the cartridge design from the standpoint of mass transfer (urea, etc.) considerations. In the disclosed embodiment the desired minimum spacing may be achieved by providing the segments 36 with a predetermined thickness relative to the thickness of segments 34. For dialysis of blood a spacing in the order of .003 inch is preferred and this spacing can be obtained by making the thickness of segments 36 such that they are about .003 inch less in thickness than segments 34.

In fabrication of the dialyzing elements 30, the frames 32, mesh sheets 52, and separate halves of the housing 24 may be molded from low cost medically acceptable plastic materials such as acrylic plastic to the configurations shown using injection molding techniques. The membranes 56 may be formed from medically acceptable semipermeable material such as cellophane with planar dimensions complemental to the frame dimensions.

In assembly the mesh sheets 52 may be fixed by cementing or by welding to the upper and lower surfaces 50 of the opposite frame segments and to the ribs 38. The membranes 56 may then be sealed to the upper and lower perimeter surfaces 54 by a cement or by an appropriate welding process. One preferred method of welding the membranes 56 to the frames is that disclosed in copending application Ser. No. 608,921, filed on Jan. 12, 1967 by Dean Critchell et al. and assigned to the same assignee as the present invention.

In assembling the complete cartridge the dialyzing elements 30 are stacked in the "tongue and groove" arrangement previously described. The grooves 40 and/or depending flanges 42 of the individual dialyzing elements may be coated with a suitable cement or welded during the stacking process to provide a rigid stacked assembly.

In the disclosed embodiment of the invention the separate halves of the housing 24 are cemented or welded to the stacked assembly of dialyzer elements 30 formed in the manner described above and to each other to complete the cartridge assembly. For example, a suitable cement may be applied to the corner columns of the stacked assembly defined by the abutting surfaces 44 and abutting end portions 46 of the opposite frame segments 34, to the upper surfaces of the opposite segments 34 and 36 of the uppermost frame 32 and to the joining edges to the two part housing 24. The stacked assembly may be then placed in one-half of the housing 24 and the other half may be attached to complete the cartridge. If a welding process is used, sealing is accomplished after the stacked assembly is positioned in the housing 24.

If the parts of the cartridge are fabricated from acrylic plastic material and the membranes from cellophane material, the plastic parts may be readily joined together using known welding techniques such as heat or ultrasonic techniques or may be readily cemented together using medically acceptable cements such as the No. 910 cement manufactured by Eastman Kodak Company or cements selected from the RTV Series manufactured by General Electric Company. The plastic parts may also be bonded using a cement consisting of acrylic plastic material in a suitable solvent. The cellophane membranes may be readily attached to the frames by a welding process such as disclosed in the aforementioned copending application Ser. No. 608,921 or by cementing using acceptable cements such as Eastman 910 or cements selected from the General Electric RTV Series.

Referring now to the specific features of the assembled cartridge and specifically to FIG. 3 of the drawings, it will be noted that sealing of the corners of the stacked assembly of dialyzing elements 30 to the interior corners of the housing 24 in the manner described effectively results in confinement of the manifolds 26a, 26b, 26c, and 26d to the separate walls of the stacked assembly respectively. With the orientation of the stacked assembly shown in FIG. 3 the manifolds 26b and 26d serve the opposite sides of the stacked assembly as defined by the opposite frame segments 34 and thus communicate with the fluid openings 48 on opposite sides of the stacked assembly and the interior of each dialyzing element 30. A source of fluid under pressure supplied to one of the manifolds 26b or 26d will accordingly flow through the hollow interiors of the dialyzing elements 30 in parallel flow paths to the opposite manifold.

Similarly, the manifolds 26a and 26c communicate with the opposite sides of the stacked assembly defined by the frame segments 36 and thus communicate with the chambers or fluid passages 56 between adjacent membrane walls of adjacent dialyzing elements 30. A fluid under pressure supplied to one of the manifolds 26a or 26c will accordingly flow between the dialyzing elements 30 in parallel flow paths to the opposite manifold. The cartridge 10 accordingly defines two independent isolated flow paths, one through the hollow interior of the dialyzing elements 30 and the other between said elements. The manifolding arrangement uniquely defining and isolating the fluid flow paths provides near perfect flow distribution along the entrance to the flow paths between the membranes and presents practically no resistance to fluid flow and the pressure drop across the cartridge is accordingly minimum.

In use of the cartridge as a dialyzer, fluid to be dialyzed may be circulated through either of the above described flow paths and a dialyzant through the other. When the cartridge is used to dialyze blood in an artificial kidney system such as shown in FIG. 1 of the drawings, the blood is preferably supplied to one of the manifolds 26a or 26c and the dialyzant supplied to one of the manifolds 26a or 26d so that blood will flow between the dialyzer elements 30 while dialyzant will flow through said elements. By virtue of the unique structure of the dialyzing elements 30 the spacing between the adjacent membranes of adjacent dialyzer elements can be made very small as will presently be described in more detail to minimize the blood capacity and increase the mass transfer capability of the cartridge.

Referring now to the specific operation of the dialyzer elements 30 when the cartridge is used as an artificial kidney, reference is made to FIGS. 6, 7, and 8 of the drawings which are enlarged sectional views of several stacked dialyzer elements 30 with the space between adjacent membranes of adjacent elements exaggerated to illustrate more clearly the flow passages. FIG. 6 of the drawing illustrates the positions of the membranes in the absence of fluid flow whereas FIGS. 7 and 8 illustrate the positions of the membranes during fluid flow. As will be observed in FIG. 6 the membranes have a flat smooth configuration in the absence of fluid flow, the mesh sheets 52 serving to reinforce the membranes. During the existence of fluid flow the blood flow between adjacent elements 30 will tend to flex the membranes 56 and mesh sheets 52 slightly between the ribs 38 as shown in FIGS. 7 and 8.

If the nipples 28a and 28c of the cartridge 10 are coupled to a patient's artery and vein cannula (not shown) by means of the system shown in FIG. 1 blood will be circulated through the cartridge in the direction indicated by the arrow in FIG. 7 through the parallel flow paths between the dialyzing elements 30 in response to the pressure differential of the patient's blood system. The wedge-shaped frame segments 36 cooperate to define an entrance throat to each of the separate blood paths to minimize the flow resistance of the same. By positioning the adjacent membranes of adjacent dialyzing elements in closely spaced relationship substantially the entire thickness of the blood is dialyzed and a nondialyzed central thickness layer is avoided.

The unique manifolding arrangement disclosed results in an efficient crossflow of blood and dialyzant relative to each membrane and contributes to the low pressure drop across the blood flow paths by achieving uniform pressure distribution along the entrance to each blood flow path. The wedge shaped frame segments 36 and the smooth exterior surfaces of the dialyzing elements minimize the flow resistance of each flow path and achieve a uniform blood flow without the turbulence or shearing effects inherent in prior art kidneys. The converging-diverging nozzles defined by the surfaces $f$ and $g$ of the nipples 28a and 28c and the surfaces $g$ of manifolds 26a and 26c serve to effect a smooth non-turbulent flow of blood into the inlet manifold and from the outlet manifold. More specifically blood flow entering the nipple 28a is converged by passage $f$ thereof and then diverged by surface $g$ of manifold 26a to effect a smooth distribution of flow into the manifold 26a and along the surfaces thereof. Similarly blood flow leaving the nipple 28c is first converged by surface $g$ of manifold 26c and then diverged by passage $f$ of nipple 28c to effect a smooth flow into the outlet or return tube.

The dialyzing elements 30 are sized to achieve optimum mass transfer characteristics and optimum fluid flow characteristics. Prior to fabrication of an actual cartridge in accordance with structural concepts herein disclosed, all parametric quantities relating to flow and mass transfer were computed using mathematical models and a computer program. Parametric quantities considered were blood flow rate (in response to heart action), dialyzant flow rate, blood pressure drop, dialyzant pressure drop, hydraulic diameter of the blood flow path as related to spacing of adjacent membranes of adjacent dialyzing elements, blood viscosity, mass transfer resistance of the membranes, membrane area, and the number of membranes. In accordance with this data and the structural concepts herein disclosed an artificial kidney cartridge was achieved having overall nominal dimensions of 2 x 2 x 8 inches, a maximum blood capacity of 0.1 pint, and a blood pressure drop of less than 40 mm. of mercury. Sixty dialyzing elements were used having planar dimensions of approximately 2 x 2 inches stacked with a spacing of .003 inch between adjacent membranes of adjacent dialyzing elements. The height, width and length of each blood flow path was accordingly .003, 2, and 2 inches respectively.

The entire cartridge was fabricated from low cost plastic materials using the preferred techniques hereinbefore described. It is estimated that the cost of similar cartridges manufactured on mass production basis would be less than $10.00. The cost of the cartridge would accordingly be less than the cost of cleaning and sterilizing for reuse, and accordingly the cartridge can be disposed of after each usage.

By exploratory laboratory tests it has been determined that a cartridge of the dimensions and configuration herein disclosed has a urea dialyzance figure (grams of urea impurity removed per minute per grams per milliliter concentration) in the order of 3. Moreover as a result of exploratory tests it is anticipated that the smooth undisturbed flow of blood and the short bloodflow paths through the cartridge will minimize the use of anticoagulants by the patients.

One particular advantage of an artificial kidney in accordance with the invention is the fact that it can be completely assembled, sealed, tested, and sterilized at the factory on a mass production basis. This feature eliminates many of the assembly and sterilization problems associated with current artificial kidneys and permits high quality to be achieved on a mass production basis. The kidney may be manufactured and packaged in a suitable sterilized container with the blood portions completely filled with an aqueous saline solution which mixes with blood. In usage, it is only necessary to remove the cartridge from the sterilized package and couple it to a patient. This simplicity of packaging and subsequent use is made possible by the small size and low blood capacity of the cartridge. The volume of saline solution is medically insignificant in relation to the total volume of blood in the circulatory system of a person.

We claim:

1. A disposable artificial kidney comprising:
    a stacked assembly of dialyzing elements each comprising a frame of plastic material having spaced semipermeable membrane walls, said elements being stacked with the adjacent membrane walls of adjacent frames in closely spaced substantially parallel relationship to define thin chambers for bood between adjacent membrane walls of adjacent elements and chambers for dialyzant between the membrane walls of each frame; and
    a housing enclosing said assembly and defining inlet and outlet manifolds for blood communicating with said blood chambers and inlet and outlet manifolds for dialyzant communicating with said dialyzant chambers;
    said inlet and outlet manifolds for blood and said blood chambers having a total blood volume less than 60 cc.

2. A disposable artificial kidney for dialyzing blood comprising:
    a stacked assembly of dialyzing elements each comprising a frame of plastic material having spaced semipermeable membrane walls, said elements being stacked with the adjacent membrane walls adjacent frames in closely spaced substantially parallel relationship to define thin chambers for blood between adjacent membrane walls of adjacent elements and chambers for dialyzing between the membrane walls of each frame;
    a housing enclosing said assembly and defining inlet and outlet manifolds for blood and communicating with said blood chambers and inlet and outlet members for dialyzant communicating with said dialyzant chambers;

said inlet and outlet manifold for blood and said blood chambers having a total blood volume less than 60 cc.; and an aqueous solution which mixes with blood filling said inlet and outlet manifolds whereby the kidney may be coupled directly to the patient.

3. In a dialyzer cartridge comprising:

a stacked assembly of dialyzing elements separated by spacing means to define spaces between adjacent elements, each of said elements comprising a rectangularly shaped frame having an opening defined by a first pair of opposite segments and a second pair of opposite segments, fluid inlets and outlets in said first pair of opposite segments of said frame and communicating with said opening;

semipermeable membranes sealed to the opposite sides respectively of said frame to cover said opening, means disposed in said opening to support said membranes substantially parallel to each other;

and a housing enclosing said stacked assembly and defining first inlet and outlet manifold means communicating with said fluid inlets and outlets for circulating a first fluid through the interiors of said frames in contact with the interior surfaces of said membranes, said housing also defining second inlet and outlet manifold means for circulating a second fluid through said spaces between adjacent elements to effect transfer of molecules from one fluid to the other by dialysis through said membranes, the improvement wherein:

said spacing means are defined by a first thickness of said first pair of opposite segments and by a second thickness of said second pair of opposite segments, said second thickness being less than said first thickness;

said dialyzing elements being stacked with the respective first pairs of opposite segments of adjacent elements sealed together to define said spaces between adjacent membranes, said spaces corresponding generally to the difference between said first and second thickness;

each segment of said first pair of opposite segments having on one end a first integral projection and on the other end a second integral projection, said integral projections of adjacent elements being in sealed engagement in said stacked assembly, the integral projections on one segment of said first pair of opposite segments being sealed to said second inlet manifold means and the integral projections on the second segment of said first pair of opposite segments being sealed to said second outlet manifold means.

4. The invention of claim 3 wherein said semipermeable membranes and said sides present substantially smooth coplanar surfaces to facilitate uniform flow of fluid between adjacent elements.

5. The invention of claim 3 wherein said second pair of opposite segments of said frames have a wedge shaped configuration to facilitate the uniform flow of fluid between adjacent membrane walls of adjacent frames.

6. The invention of claim 3 wherein said first pair of opposite segments are provided with elongated recesses on one side thereof and elongated projections on the other side thereof complemental to said recesses for stacking said frames in interlocking relationship.

7. In an artificial kidney for transferring impurities from blood to a dialyzant, said kidney comprising:

a stacked assembly of dialyzing elements separated by spacing means to define spaces between adjacent elements, each of said elements comprising a plastic frame having an opening defined by a first pair of opposite segments and a second pair of opposite segments;

fluid inlets and outlets in said first pair of opposite segments of said frame;

semipermeable membranes sealed to the opposite sides respectively of said frame to cover said opening; and a plastic housing enclosing said stacked assembly and defining first inlet and outlet manifold means communicating with said fluid inlets and outlets for circulating a dialyzant through the interiors of said frames in contact with the interior surfaces of said membranes, said housing also defining second inlet and outlet manifold means for circulating blood through said spaces between adjacent elements to effect transfer of impurities from the blood to the dialyzant by dialysis through said membranes, the improvement wherein:

said spacing means are defined by a first thickness of said first pair of opposite segments and by a second thickness of said second pair of opposite segments, said second thickness being less than said first thickness;

said dialyzing elements being stacked with the respective first pairs of opposite segments of adjacent elements welded together to define said spaces between adjacent membranes;

said spaces corresponding generally to the difference between said first and second thickness; and said plastic housing is welded to said stacked assembly.

8. The invention of claim 7 wherein said housing defines inlet and outlet passages for said first inlet and outlet manifolds respectively, said passages and the adjacent interior surfaces of their respective manifolds being shaped to define converging-diverging nozzles to facilitate flow of blood through the cartridge with minimum flow resistance and flow disturbance.

9. The invention of claim 8 wherein said second pair of opposite segments of said frames are generally wedge shaped to facilitate the uniform flow of blood through said blood passages.

10. In an artificial kidney for transferring impurities from blood to a dialyzant, said kidney comprising a stacked assembly of dialyzing elements separated by spacing means to define spaces between adjacent elements, each of said elements comprising a plastic frame having an opening defined by a first pair of opposite segments, and a second pair of opposite segments;

semipermeable membranes sealed to the opposite sides respectively of said frame to cover said opening, the improvement wherein:

said spacing means are defined by a first thickness of said first pair of opposite segments and by a second thickness of said second pair of opposite segments, said second thickness being less than said first thickness;

said dialyzing elements being stacked with the respective first pairs of opposite segments welded together to define said spaces between adjacent membranes, said spaces corresponding generally to the difference between said first and second thickness.

11. The invention of claim 10 wherein said second pair of opposite segments of said frames are generally wedge shaped to facilitate the uniform flow of blood through said spaces between adjacent elements.

12. The method of making an integral plastic dialyzer cartridge which includes the steps of:

molding a plurality of dialyzer frames from plastic;

sealing semipermeable membranes to opposite sides respectively of said frames to form a plurality of dialyzer elements;

welding adjacent dialyzing elements together to form an integral stacked assembly of dialyzer elements;
welding the first part of a two-part plastic housing to said integral stacked assembly; and
welding the second part of said two-part housing to said integral stacked assembly and to said first part of said two-part plastic housing.

References Cited

UNITED STATES PATENTS

| | | | |
|---|---|---|---|
| 2,225,024 | 12/1940 | Weber | 23—252 |
| 2,444,147 | 6/1948 | Walton | 210—486 |
| 2,664,395 | 12/1953 | Marchand | 210—321 |
| 2,982,416 | 5/1961 | Bell | 210—321 |
| 3,051,316 | 8/1962 | MacNeill | 210—321 |
| 3,266,629 | 8/1966 | Megibow | 210—321 |
| 3,342,719 | 9/1967 | Chen et al. | 210—321 X |
| 3,369,343 | 2/1968 | Robb | 55—158 X |

FOREIGN PATENTS 938,127  10/1963  Great Britain.

REUBEN FRIEDMAN, Primary Examiner

FRANK A. SPEAR, JR., Assistant Examiner

U.S. Cl. X.R.

210—346, 486; 264—249